O. J. WILLIAMS.
THERMOMETER FOR THE COOLING SYSTEMS OF INTERNAL COMBUSTION ENGINES.
APPLICATION FILED DEC. 8, 1915.
1,220,150.
Patented Mar. 20, 1917.
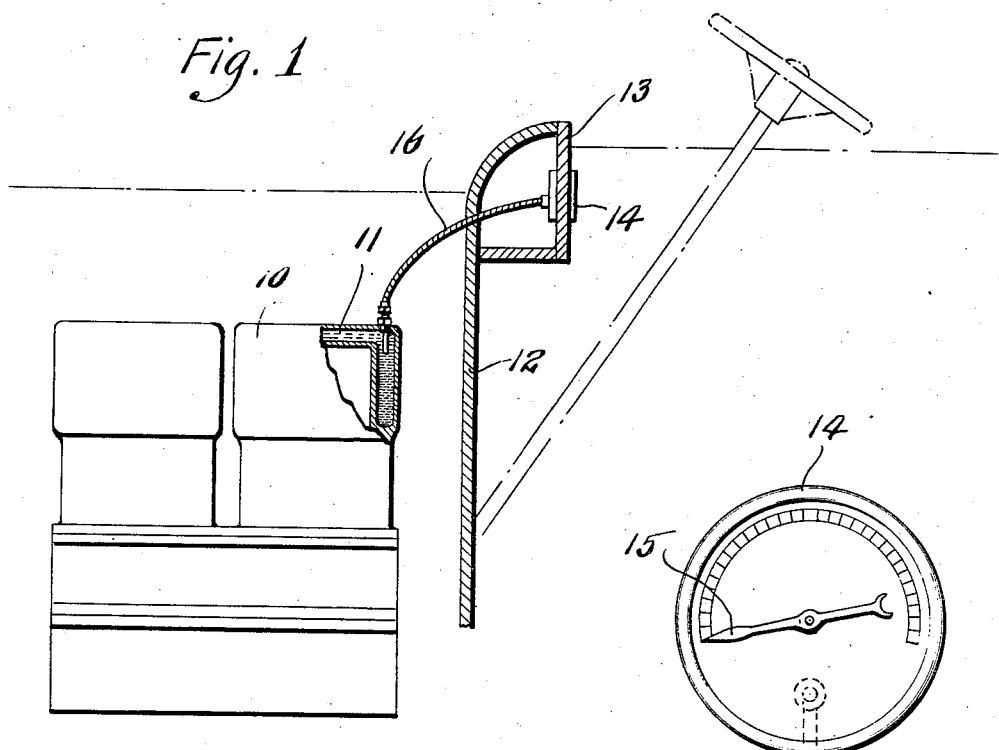
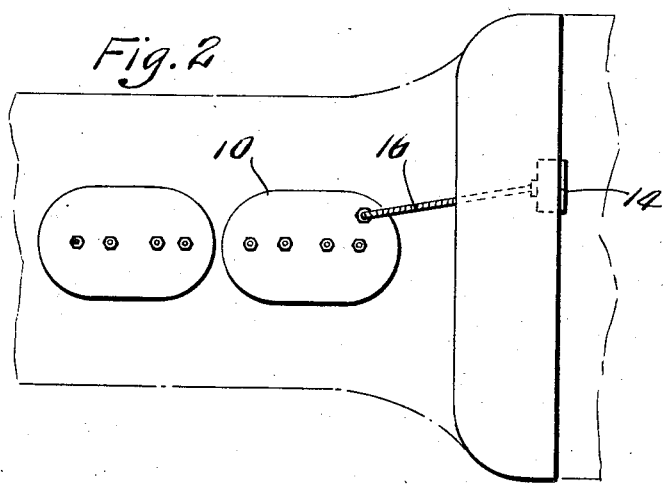
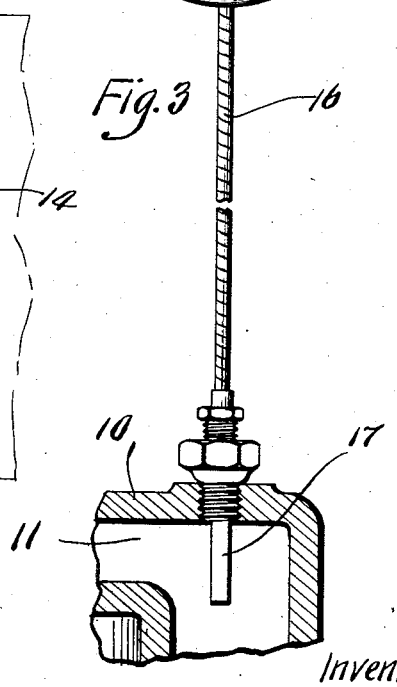
Inventor
Oliver J. Williams
By *F. H. Cornwall.* Atty

UNITED STATES PATENT OFFICE.

OLIVER J. WILLIAMS, OF SAN FRANCISCO, CALIFORNIA, ASSIGNOR TO PHILO M. GELATT, OF LA CROSSE, WISCONSIN.

THERMOMETER FOR THE COOLING SYSTEMS OF INTERNAL-COMBUSTION ENGINES.

1,220,150.   Specification of Letters Patent.   Patented Mar. 20, 1917.

Application filed December 8, 1915. Serial No. 65,720.

*To all whom it may concern:*

Be it known that I, OLIVER J. WILLIAMS, a citizen of the United States, residing at San Francisco, California, have invented a certain new and useful Improvement in Thermometers for the Cooling Systems of Internal-Combustion Engines, of which the following is a full, clear, and exact description, such as will enable others skilled in the art to which it appertains to make and use the same, reference being had to the accompanying drawings, forming part of this specification.

My invention relates generally to thermometers and more particularly to a thermometer for indicating the heat of the fluid medium utilized as a cooling element for the cylinders of internal combustion engines.

The principal object of my invention is to provide a comparatively simple, inexpensive and efficient heat indicating device which is particularly adapted for use in connection with the internal combustion engines now universally used as the power element in automobiles, motor boats, tractors and the like, and which device is constructed and arranged so that the bulb which contains the expansible fluid is located within the water jacket which surrounds the cylinder or cylinders of the engine the indicating dial of the device being located at a point where it may be conveniently observed by the operator of the engine or the driver of the vehicle.

It will be understood that practically all internal combustion engines and particularly those used on motor vehicles are cooled by means of water which circulates through a water chamber around the engine cylinders and through a radiator usually located adjacent to the engine, and in some instances it has been the practice to arrange thermometers in or upon the radiators for the purpose of determining the degree of heat of the water or cooling medium circulating therethrough, but such devices are not effective for a number of reasons, the principal one being that the radiator is usually located some little distance in advance of the engines and consequently the temperature of the cooling fluid in the radiator is considerably lower than the temperature of said cooling medium within the water chamber of the engine.

Another disadvantage of the devices heretofore used is that as the water or cooling fluid boils away it naturally lowers within the radiator and where the thermometer is located in the upper portion of said radiator and the water level lowers, the bulb of said thermometer is not always immersed in the water and consequently said thermometer indicates the temperature of the air in the space above the water in the radiator, instead of the actual temperature of said water.

The radiator in the cooling system for automobile engines is usually located some little distance in front of the engines and a considerable distance away from the driver and where the thermometer is located in the radiator it is practically impossible for the driver from his seat within the vehicle to discern the height of the column of mercury or expansible fluid in the glass tube forming a part of the thermometer.

I propose to overcome the objectionable features just noted by providing a construction wherein the bulb containing the mercury or expansible fluid is located within the water chamber around the engine cylinders and to extend a tube from said bulb to a thermometer, preferably of the dial type, the same being located on the dash or instrument-board of the vehicle, which latter is usually located immediately in front of the operator's seat.

By virtue of this construction it is possible for the operator to readily observe the exact temperature of the fluid in the cooling system and in this connection it will be understood that the fluid in the chamber around the rear engine cylinder usually has the highest degree of temperature. However, I do not desire to be limited to the location of the bulb at any particular point in the water chamber around the engine for said bulb can, in some instances, be advantageously located in the water chamber around the intake or outlet manifold.

With the foregoing and other objects in view, my invention consists in certain novel features of construction and arrangement of parts, hereinafter more fully described, claimed and illustrated in the accompanying drawings, in which—

Figure 1 is a diagrammatic view including an internal combustion engine with a portion of one of the cylinders thereof in section, a portion of the dash and instrument board of a motor vehicle and showing my invention applied for use.

Fig. 2 is a plan view of the parts seen in Fig. 1.

Fig. 3 is a front elevational view of a thermometer of my improved construction and showing a portion of the water jacket of an internal combustion engine in which the thermometer bulb is located.

Referring by numerals to the accompanying drawings, 10 designates an internal combustion engine, the cylinders of which are provided with the usual double walls, thereby forming a chamber 11 which is filled with a cooling medium, preferably water.

It will be understood that this fluid circulates through the entire cooling system, the same including the usual radiator which in motor vehicles is usually located at the front of the hood over the engines.

12 designates the dash of the vehicle body and 13 the instrument-board which latter is usually located on the upper portion of the dash and at a point immediately in front of the driver's seat.

Located at a convenient point on the instrument-board 13 is the housing 14 of an ordinary dial thermometer, the same being provided with a hand or pointer 15 which indicates degrees of temperature on a suitably graduated scale. Leading from the operating mechanism within the housing of this thermometer is a small tube 16, preferably flexible, the same extending forwardly through the dash 12 and thence downwardly to a bulb 17, which latter is removably seated in the jacket wall of the rear engine cylinder and extends a substantial distance into the water chamber within said cylinder.

It will be understood that the bulb 17 and tube 16 are filled with mercury or like expansible fluid which when heated acts upon the hand operating mechanism within the housing 14 to cause said hand to register the degree of heat immediately adjacent said bulb.

Usually the maximum temperature of the fluid in the cooling system is to be found in the water chamber to the rear of the rear cylinder which condition is due to the fact that this point in the cooling system is farthest from the radiator and the latter is usually subjected to a current of air from a fan and by placing the bulb of the thermometer in the water chamber adjacent to the rear cylinder, the thermometer will accurately register the meximum temperatures in said cooling system.

A device of my improved construction is comparatively simple, can be easily and cheaply installed, is applicable for use in connection with all forms of internal combustion engines having a circulating fluid cooling system, and is effective in accurately registering the maximum temperature of the fluid in said system.

It will be readily understood that minor changes in the size, form and construction of the various parts of my improved device can be made and substituted for those herein shown and described, without departing from the spirit of my invention, the scope of which is set forth in the appended claim.

I claim:

The combination with a motor vehicle and its internal combustion engine, the cylinder of which is provided with a jacket wall inclosing a chamber adapted to receive a cooling liquid, of a thermometer having its temperature responsive element secured in the jacket wall of the cylinder and projecting into the chamber where it is submerged in the cooling liquid therein, a temperature indicator located on the dash of the motor vehicle, and a flexible tube connecting said thermometer and the temperature indicating element, which tube is filled with a temperature responsive element.

In testimony whereof I hereunto affix my signature in the presence of two witnesses, this 2nd day of December, 1915.

OLIVER J. WILLIAMS.

Witnesses:
HARRY L. HORN,
EVELYN V. BROWNRIDGE.